Oct. 10, 1961  H. W. MOSER ET AL  3,003,380
FLYING CUTTER CONTROL MEANS FOR VARYING
FLYING FREQUENCY AND RETAINING FLYING
SPEED OF CUTTERS
Filed Jan. 26, 1959  4 Sheets-Sheet 2

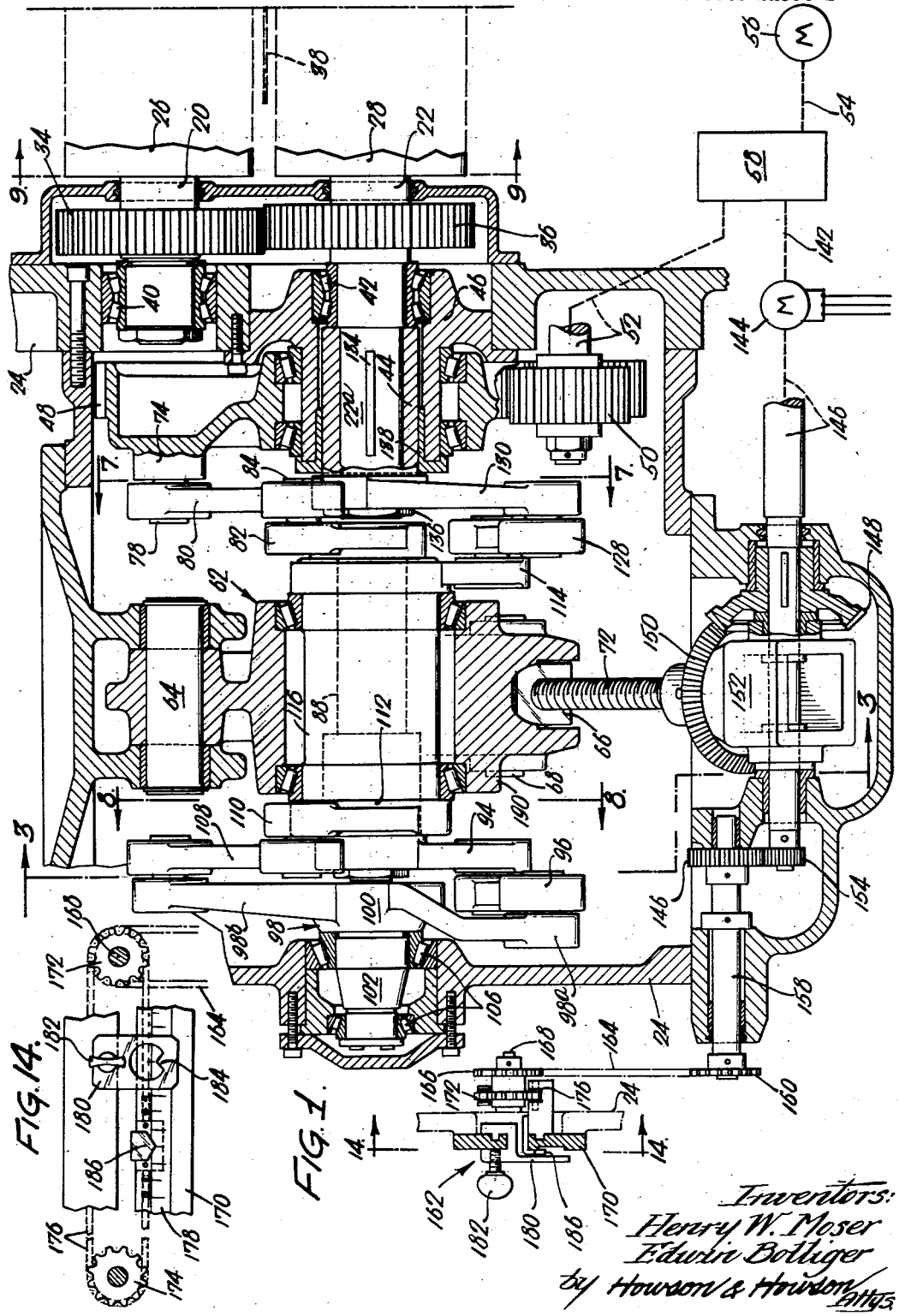

Inventors:
Henry W. Moser
Edwin Bottiger
by Howson & Howson
Attys.

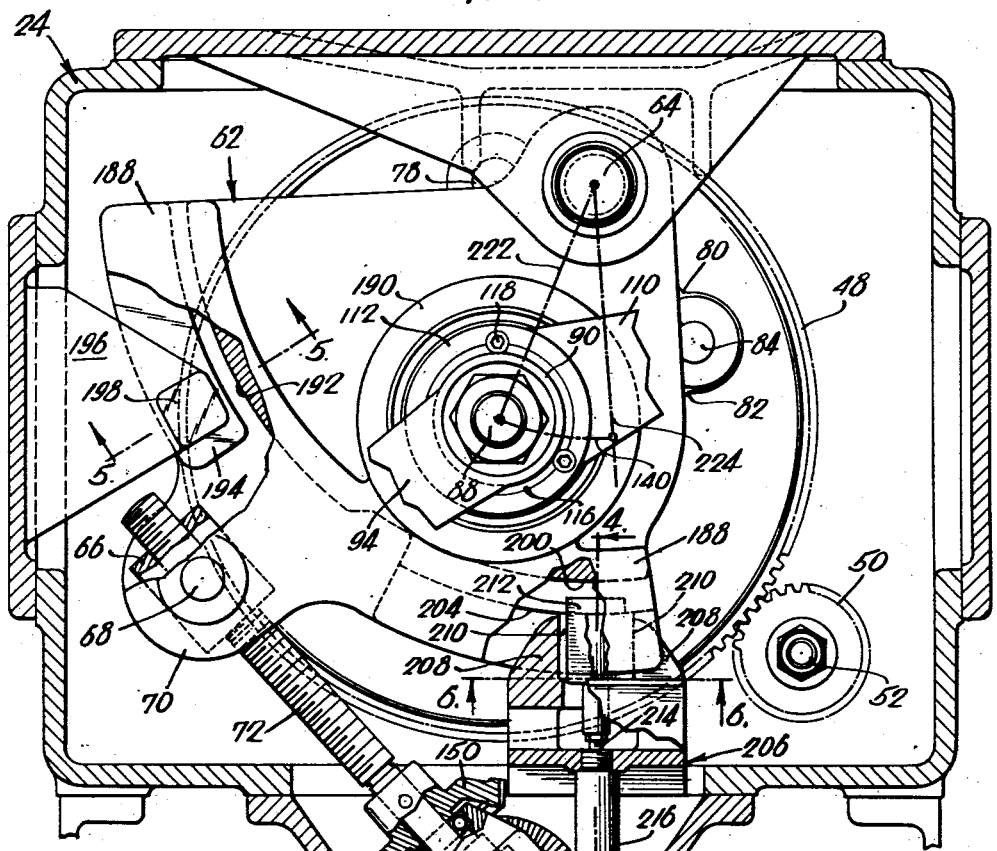
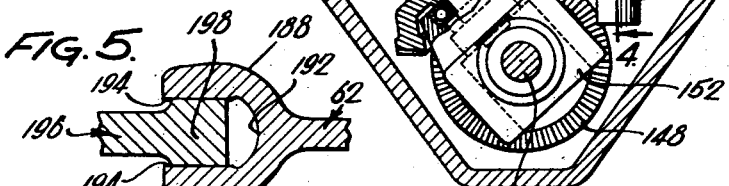
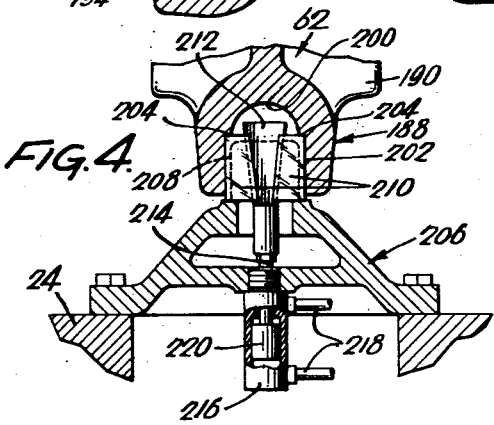
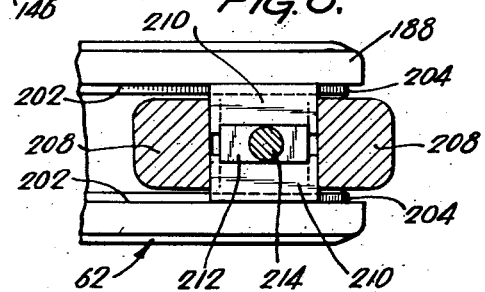

United States Patent Office 3,003,380
Patented Oct. 10, 1961

3,003,380
FLYING CUTTER CONTROL MEANS FOR VARYING FLYING FREQUENCY AND RETAINING FLYING SPEED OF CUTTERS
Henry W. Moser and Edwin Bolliger, Haddonfield, N.J., assignors to Samuel M. Langston Company, Camden, N.J., a corporation of New Jersey
Filed Jan. 26, 1959, Ser. No. 788,834
10 Claims. (Cl. 83—299)

The present invention relates broadly to a rotary type cut-off machine, particularly adapted in the manufacture of corrugated board to cut the board into successive sections or sheets as it is continuously produced and delivered from a double facer.

Heretofore machines have been devised for driving cutter rolls in a cut-off mechanism of the continuously driven type, the machines being variable or adjustable so that the continuously moving board may be selectively cut into sheets of any desired lengths within the range of the machine. Such machines, however, are not satisfactory for, nor can they be expanded to accommodate present day demands for longer sheets and higher operating speeds. The mechanism of the present invention is operable to cut board produced and delivered from double facers at high speed, and with a wide range of sheet lengths.

A cut-off mechanism presently in use incorporates a Whitworth type drive mechanism, as shown in Behrens patent 2,262,913. This cut-off mechanism and the drive therefor, while operable in lower speed ranges and smaller sheet length ranges, is not adapted for the high speed operation and increased sheet lengths as referred to above.

Another cut-off mechanism currently in use incorporates a cyclically variable speed driving mechanism which in essence is a duplex drag link mechanism. Such apparatus is disclosed in Morrision Patent 2,215,762. This apparatus likewise is not susceptible of expanding to accommodate the high speed operation of present day machines, and cannot effectively be constructed to give the required longer sheet length ranges.

Morrison utilizes a plurality of adjustable arms comprising kinematic four bar chains, and linear displacement of adjustable arms or chains to effect a cyclically variable speed drive for the cutter rolls. The physical adaptation of such a mechanism to present day requirements would require substantially increasing the referred to linear displacement of the adjustable arms, which in turn would entail a substantial increase in arm size. This increase in size, itself presenting difficulties of installation and operation, further increases weight and mass inertia which very substantially increases operating or power requirements. Due to increased mass, greater stresses would be introduced in operation requiring further strengthening of parts and increased power requirements.

In order to provide a satisfactory cut-off mechanism it is necessary to use a pair of rotary knife carrying members between which the faced board passes, and the time cycles of revolution or r.p.m. of these members is varied, which varies the frequency of cutting and the length of the cut-off sections. It is further necessary however to vary the angular velocity of the rotary knife carrying members in each revolution cyclically to permit the knives to travel at, or substantially at, the sheet speed while cutting, regardless of the total time cycle and the frequency of cuting.

Preferably the speed of travel of the knives, while cutting, is constant for a given sheet speed and accordingly the speed of travel of the knives between successive cuts must be varied in accordance with the length of the sheet sections into which the board is being cut. If the sheets are short, the knives travel rapidly from cutting position back to cutting position, but if the sheets are long, the knives must travel at a very much lower average speed in this part of the cycle. Machines of the nature described in the above mentioned patents and others teach this general type of operation including means for simultaneously adjusting both the total time cycle and the peripheral speed within the total time cycle. Basically, a Reeves drive type of unit is utilized for obtaining the selected total time cycle and mechanism including such for example, as adjustable elliptical gears, crank and slide, or lever and link mechanisms are used for obtaining the speed variation in the cycle of rotation. With reference to lever and link type mechanisms there have been utilized a single link, as in Patent 2,202,872; or a pair of links connected by a pair of gears through which power is transmitted as in Patent 2,204,067; or a bell crank lever with links connecting the lever ends to coaxial driven and driving members as in the aforesaid Morrison patent; or mounting driving and driven members coaxial, with a bell crank lever mounted on an axis which is parallel to the common axis of said members and adjustable toward and away from said common axis, and connecting said members to the arms of said lever by a pair of links, as in Patent 2,262,971.

While many of these aforementioned types of machines have proven satisfactory under conditions where the machine is operated at relatively low speeds, or where the sheet length range of the sheets to be cut-off is such that the difference between the slowest and fastest angular velocity of the knife in its cyclic travel is not great, difficulties and objectionable results are encountered when the machine is adjusted for cutting sheets of such length that there is a very big difference in the angular velocity of the knives at different parts of their cyclic travel, and the machine is operated at high speed to obtain the maximum output.

It is an object of the present invention to provide a drive mechanism for cut-off rolls which overcomes the drawbacks in presently known devices under high speed machine operations, and which is effective for cutting sheets of substantial length not heretofore possible in known constructions. Morrison, for example, utilizes a duplex drag link mechanism which for reasons pointed out above cannot satisfactorily be expanded within physical limitations and desires to operate in the required manner. The present invention provides a quadruple drag link mechanism of a new, novel and ingenious character which permits the necessary build-up of speed in the cyclic travel or paths requisite to ooperate the machine satisfactorily at the high speeds necessary to obtain maximum output, while at the same time effectively reducing horsepower requirements for operation. Such a quadruple arrangement incorporating the drag links of plural stages permits the net result of compounding the velocity differential of the transmission units output shaft since the combined maximum velocities of both duplex drag link systems become additive, and produces a satisfactory velocity differential for controlling angular velocity of the knives at different parts of their cyclic travel, within the requisite total time cycle of revolution of the knives to give desired sheet length.

While only a single embodiment of the invention is shown and described in detail herein, it will be readily understandable that this is merely illustrative and will suggest minor variations therein within the spirit and scope of the invention and accordingly is not to be considered in a limiting sense. In the accompanying drawings:

FIG. 1 is a view partly in elevation and partly in section of a transmission in accordance with the present invention;

FIG. 3 is an elevational view, with parts broken away for clarity, taken on line 3—3 of FIG. 1;

FIG. 4 is a sectional view taken on line 4—4 of FIG. 3;

Figure 7:
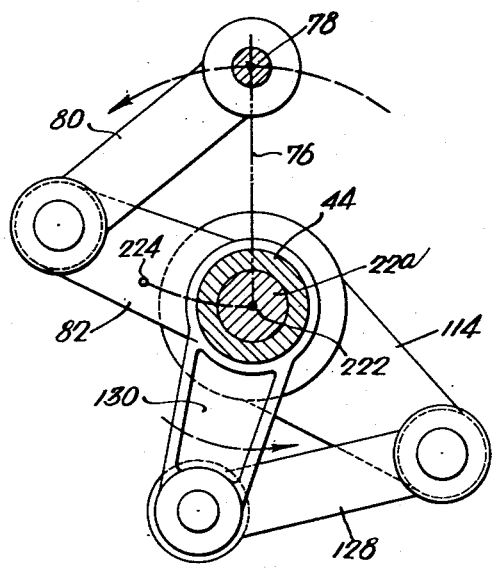
Figure 8:
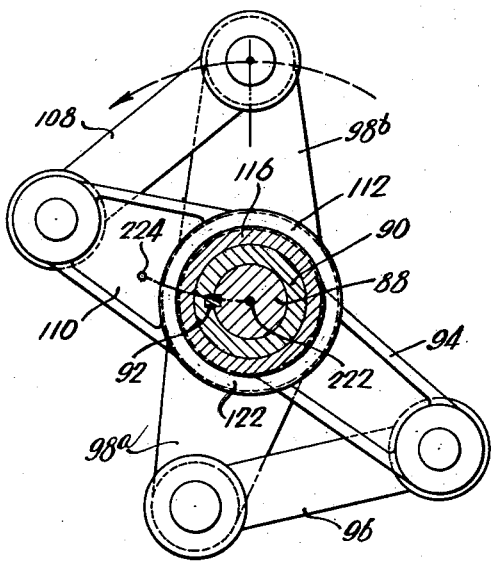
Figure 9:
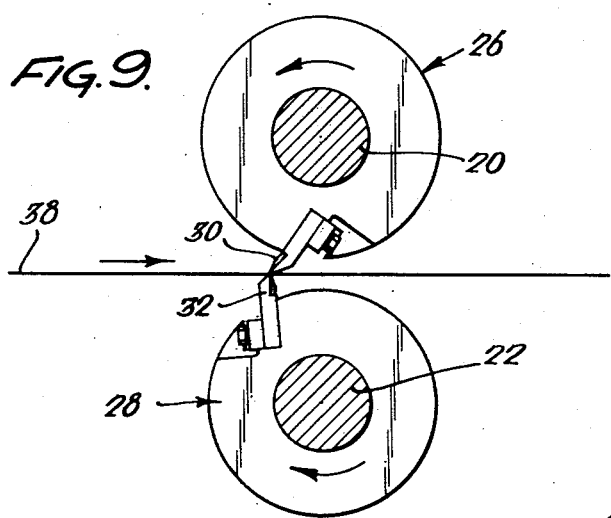

FIGS. 5 and 6 are sectional views taken on lines 5—5 and 6—6 respectively of FIG. 3;

FIGS. 7 and 8 are views taken on lines 7—7 and 8—8 respectively of FIG. 1;

FIG. 9 is a view taken on line 9—9 of FIG. 1;

FIGS. 10–13 inclusive are diagrammatic views of the component members of the drive mechanism, showing in heavy lines an adjusted position for cutting relatively long sheets, and in dotted lines, a position for cutting relatively short sheets, each figure graphically indicating separate links of the system; and FIG. 14 is a fragmentary view taken on the line 14—14 of FIG. 1.

Referring now in detail to the drawings, the cutter part of the mechanism illustrated may consist of any one of known standard types. The cutter mechanism illustrated includes a pair of cutting cylinders, having trunnions such as at 20, 22 at their ends, mounted in the usual spaced parallel relationship by means of the trunnions, journalled in a frame structure generally designated 24. The cutting cylinders 26 and 28, partially shown, carry cutting knives 30 and 32 respectively on their peripheries in a known manner. Intermeshing gears 34 and 36 are secured on trunnions 20 and 22 respectively, and are adapted to drive cutting cylinders 26 and 28 at the same angular velocity. The cutting cylinders are in a normal manner placed above and below the plane of feed of the sheet material 38 to be cut, the direction of travel of the sheet and cutting cylinders being indicated by arrows in FIG. 9. The cutting cylinders are suitably mounted for rotation by means including bearing members such as at 40 and 42 at each end for coaction between the cutting knives 30 and 32 to sever the traveling sheet 38 at desired time increments, and therefore desired and predetermined lengths. As will appear hereinafter, means are provided for adjusting the r.p.m. of these cutting cylinders so that with a constant rate of sheet feed the required size of sheet will be cut.

The inner end of trunnion 22 is provided with an extension 22a confined within and splined to a sleeve like extension 44 of a drive element, rotatably mounted within a supporting and bearing structure, generally designated 46, which in turn is secured to casing 24. An annular gear 48 is rotatably mounted on the exterior of the supporting and bearing member 46 through the medium of suitable bearings. A pinion gear 50 of substantially smaller diameter than gear 48 is in meshing engagement therewith. Pinion gear 50 is carried by drive shaft 52 suitably supported for rotation in the housing. The shaft 52 which constitutes an input shaft for ultimately driving cutting cylinders 26 and 28 is adapted for driving from a shaft 54, in turn driven by motor 56, through the medium of a variable speed drive mechanism generally designated 58, and which can be of a known type such as a Reeves drive. The specific variable speed drive mechanism used can be varied and accordingly has only been schematically shown in FIG. 1 of the drawings. The relative sizes of the pinion and ring gears and the circumference of the cutting cylinders are preferably selected in accordance with the sheet length range and the maximum speed of the output shaft of the Reeves or other variable drive.

The essence of the invention of the present application resides in the means for driving the cutting cylinders, not only at a desired given r.p.m., but also so as to impart to these cutting cylinders the desired kind and extent of variation in angular velocity in each cycle of rotation.

Generally speaking the drive transmission means for the cutting cylinders includes a quadruple drag link or kinematic chain arrangement constituting four interconnected drag link systems, each comprising a stage having an input and an output, and said stages being so arranged and matched wherein the output of the first stage is superimposed on the input of the next stage. The attained velocity of the so superimposed stages is imparted to cylinder 28. Cylinder 28 in turn drives cutting cylinder 26 by virtue of meshed gears 34 and 36. In the specific form shown in the drawings, a spider cage 62 is pivotally suspended at 64 from the top of casing 24. An internally screw threaded block 66 is pivotally mounted at 68 between spaced ears 70 carried in the lower portion of spider cage 62. A screw member 72 is operatively engaged in block 66 and adapted upon rotation through adjusting means, later to be described, for varying the angular relationship and position of the spider cage with respect to its pivot 64, and permits an angular displacement of portions of the mechanism defining the quadruple drag link transmission system. The spider cage is of a unique design, incorporating position locking means, support and bracing means and guides, as will be described in detail hereinafter.

The quadruple drag link system is comprised as follows. A boss 74 is formed on the inner surface of annular gear 48, at a predetermined distance from the axis of trunnion extension 22a, and forms a first lever arm 76. A link 80 is pivotally mounted on pivot pin 78 in boss 74 and is pivotally connected at its opposite end to lever 82 by means of pin 84. The opposite end of lever 82 has formed integrally therewith a hub 86 from which extends a shaft 88 which is interconnected at its free end with a sleeve like hub 90 through a spline connection 92. The hub 90 has formed integrally therewith a lever arm 94. The lever arms 82 and 94 due to this construction form a two arm integrated lever with the arms laterally and angularly off-set with respect to one another. Referring to FIGS. 7 and 8 of the drawings, this angular relationship between arms 82 and 94 will be apparent.

Figure 2:
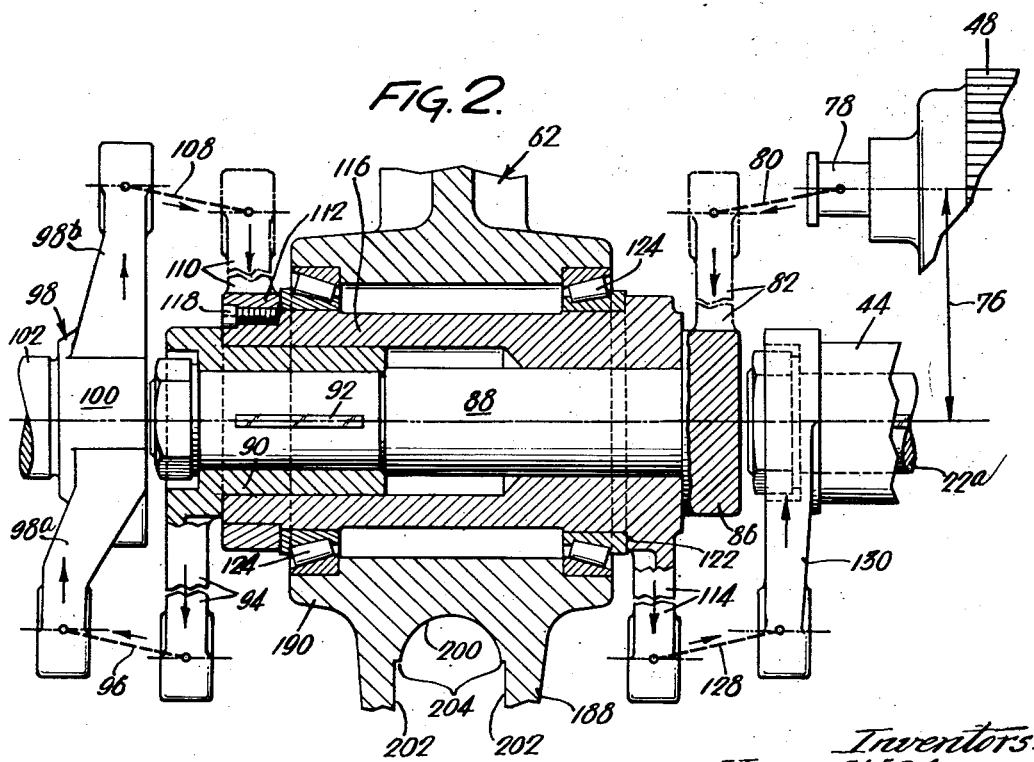
FIG. 2 is a schematic view, partly in section, of the quadruple drag link drive mechanism showing relationship of the individual levers in the various drag links.

A link 96 pivotally interconnects the free arm of lever 94 with a double armed lever 98 having a central hub portion 100 from which integrally extends a shaft 102 rotatably supported in casing 24 by means of a bearing assembly, including in the embodiment shown, taper bearing assemblies such as 106 of a known type. The arms 98a, 98b of lever arm 98 are laterally and angularly offset with respect to one another in an arrangement similar to lever arms 82 and 94. A link 108 interconnects the free end of arm 98b with a lever arm 110 having a hub 112 thereon. A lever arm 114 having a sleeve like hub 116 is adapted for connection to hub 112 mounted on a reduced end thereof by screws 118. The sleeve like hub 116, as shown in FIG. 2, has an outwardly positioned shoulder at 122 and hub 112 serves in a like manner and which are in abutting engagement with tapered bearings 124 operatively positioned between the sleeve like hub 116 and spider cage 62, also as shown in FIG. 2. Due to this construction and arrangement, there is formed in effect a two armed or double armed lever arm, including the arms 110 and 114, in a similar manner to that formed by arms 82 and 94. These pairs of arms are rotatable with respect to one another and with respect to the suspending spider cage 62.

A link 128 interconnects the free end of arm 114 with a lever arm 130 having a sleeve like hub which is the member 44, in which trunnion extension 22a is secured by means of a spline as at 134 and a nut 136. Sleeve bearing 138 is interposed between the exterior of sleeve like hub 44 and the interior of supporting member 46 to permit rotation, in conjunction with bearing members 42, of trunnion 22 together with gear 36, and thereby gear 34 and the corresponding knife rolls.

It will be noted from the foregoing description that the axes or axial centers of lever arms 76, 98, including arms 98a and 98b, and 130 are axially fixed and are held in axial alignment with the trunnion 22 of cutter cylinder 28. By virtue of the adjustable suspension mechanism hereinbefore described, the axes or axial centers of the other lever arms, which constitutes a longitudinal axis extending through the shaft 88, can be radially displaced as indicated by broken lines 140 in FIGS. 3, 7 and 8. This adjustment is accomplished by rotation of threaded screw 72 coacting with threaded block 66. In the various figures of the drawings, the various supports for the different arms are in axial alignment, and rotation of gear 50 will cause, through the lever system, rotation of the cutting rolls 26 and 28 at a uniform speed depending upon the angular velocity of the input gear 50. This is due to the fact that when so positioned the drag link mechanism does not act to accelerate or cyclically vary the peripheral speeds of the cutting rolls since the velocity ratio will then be one to one. This is a characteristic of drag link mechanisms of the type hereinabove described. In order to effect adjustments in the rate of acceleration and deceleration of the cutting cylinders 26 and 28 in different parts of their cycle to compensate for adjustments in the input speed to gear 50 by virtue of the variable speed transmission 58, it is necessary to axially or radially displace the centers or axes of the levers mounted in spider cage 62. This is accomplished by the following method and mechanism.

A shaft 142, schematically shown in FIG. 1, is operatively connected to the variable speed transmission 58, and means are provided for establishing the proper synchronous relationship between r.p.m. of the cutting rolls and the cyclical variation in peripheral velocities in a known manner. To this end shaft 142 and shaft 146 are controlled by motor 144, which serves to rotate adjustment shaft 146 and bevel gear 148 secured thereon through a desired increment of movement and adjust simultaneously speed of shaft 52 through transmission 58 by adjustment of shaft 142. A bevel gear 150 secured at the end of screw member 72 is in mesh with the gear 148 for operation thereby. Consequently upon rotation of shaft 146 and gear 148, gear 150 will rotate to radially move the spider cage 62 by coaction of screw 72 in block 68. It will be noted that the lower end of screw 72 is rotatably journalled in a pivoted or swinging block 152 rotatably mounted over shaft 146 to permit pivoting movement of the screw as the spider cage is adjusted.

The end of shaft 146 carries a pinion gear 154 in mesh with annular gear 146 on shaft 158, which extends to the exterior of the casing 24. A sprocket wheel 160 is mounted on the end of shaft 158. An adjustment indicating mechanism generally designated 162 is adapted for operation by a chain 164 entrained about sprocket 160 and sprocket 166 rotatably mounted on shaft 168. A slotted panel member 170 is suitably supported in a position exterior to the casing as shown in FIGS. 1 and 14. A second sprocket 172 is mounted on shaft 168 for rotation with sprockets 166. Laterally spaced from sprocket 172 there is another sprocket 174 (FIG. 14). A chain 176 is entrained about sprockets 172 and 174. The panel 170 has indicia 178 indicating length of sheet cut. An adjustable slider 180 is operatively and slidably mounted in the slot in panel 170 and adapted for being secured in position by means of thumb screw 182 or the like. This indicator has an opening with a pointer at 184. A second pointer or indicator 186 is operatively mounted in the slot and connected with chain 176 for movement thereby. Upon rotation of shaft 146 to position spider cage 62, the indicator 186 will move through a distance corresponding to the displacement of the spider cage and give a positive visual indication of adjustment of the device to proper conditions for cutting a desired sheet size by alignment with the present pointer 184.

While an interconnection has been shown for varying the position of the spider cage inter-dependent with the rotational speed of drive gear 50, obviously other means, either manual or otherwise, could be utilized to effect the cage adjustment.

As mentioned previously, the spider cage and the various lever arms and associated mechanism are subjected to high forces and stresses during operation particularly due to rapid acceleration and deceleration during cyclical variation of the speeds of the cutter rolls 26 and 28. Means are accordingly provided for strengthening and properly positioning the cage in any position of adjustment. By reference to FIGS. 3–6 inclusive, the construction will be described. The lower periphery of the spider cage is provided with a depending flange 188 below hub portion 190. A substantially U-shaped channel 192 is formed in the depending flange 188. Pads or the like 194 are formed on the inner opposed sides of the channel 192. A bracket 196 is secured to casing 24, and carries at its inner end an enlarged head portion 198 inserted in the channel 192 between the opposed pads 194. The pads and enlarged head portion are so dimensioned, with slight tolerances, to constitute a sliding brace for the spider cage and at the same time permit adjustment of the position of the spider cage as described hereinbefore. Preferably, the contacting faces in this construction are finished for accuracy and proper operation.

In proximity to the lower end of the spider cage a channel portion 200 is provided having opposed finished interior faces 202 terminating in shoulders 204. A supporting bracket 206 is secured on the bottom interior of the casing 24 as shown in FIG. 4. The bracket 206 is provided at its upper end with spaced retaining ears 208 which are inserted in the channel 200, and which are of less width than the channel as shown in FIG. 6. Spaced channel shaped shoes 210 having wedging faces thereon, as shown in FIG. 4, are inserted in channel 200 with their upper ends abutting shoulder 204, their transverse ends abutting ears 208 and supported on the top portion of bracket 206. These shoes are in sliding engagement with the finished faces 202 of the channel. A wedge member 212 is slidably confined between the shoes and positioned by virtue of the channels therein. A downwardly depending shaft 214 is provided on the wedge which passes through openings provided in bracket 206. A hydraulic cylinder 216 is positioned below the bracket and has fluid inlet and outlet connections 218. A piston 220 is secured to the lower end of shaft 214. When the spider cage has been adjusted to the desired position, then fluid is introduced into cylinder 216 through the upper fluid connection which forces piston 220 downwardly, and this in turn draws wedge 212 downwardly with respect to the shoes 202 which are forced into braking engagement with the surfaces 202 to thereby lock the spider cage in position during operation of the device.

When the spider cage is adjusted so that all the lever axes are in alignment, or dead center position, as indicated at 222 in FIG. 3, the driven element will rotate with uniform angular velocity as pointed out hereinbefore. As the spider cage is moved radially to progressively greater distances from this dead center or alignment position, the speed of the driven element, when in cutting position will remain substantially constant, but there will be progressively greater alternate deceleration and acceleration between cutting positions due to the quadruple drag link mechanism and its arrangement. The further from dead center position the spider cage is moved the greater will be the velocity acceleration and deceleration when approaching, during and immediately following the cutting operation provided that the sheet length is greater than the length of the knife path around its circumference. During all other rotation, the cutter rolls will be substantially slowed to permit longer sheet sizes to be cut.

Due to the arrangement of the various lever arms as described above, there is in effect created a plurality of stages or drag link combinations. The arm 76 of a first stage which is the driver arm converts the input arm 94 of a second stage into a driver with the net result of compounding the velocity differential of the various stages. The velocity curves when developed for each stage do not normally overlie when the arms of the respective stages are positioned diametrically opposite each other. For this reason, various ones of the arms must be adjusted angularly about their respective axes to restore overlapping relationship. When the velocity curves thus superimposed show maximum velocity change occurring at substantially the same point of the cycle, then the combined maximum velocity of all four drag link systems becomes additive and equal to the maximum velocity differential produced at the output shaft of the unit.

Figure 10:
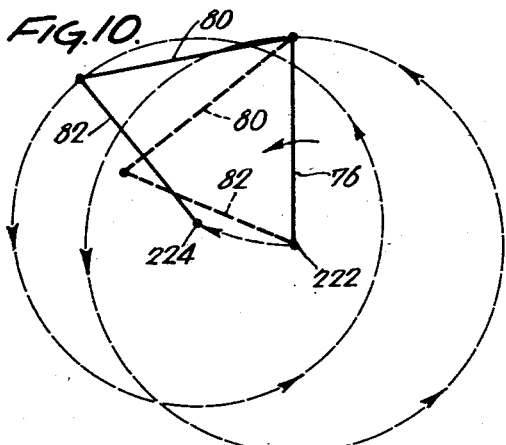
Figure 11:
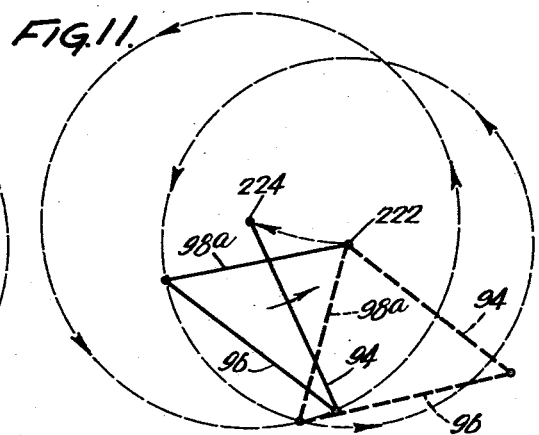
Figure 12:
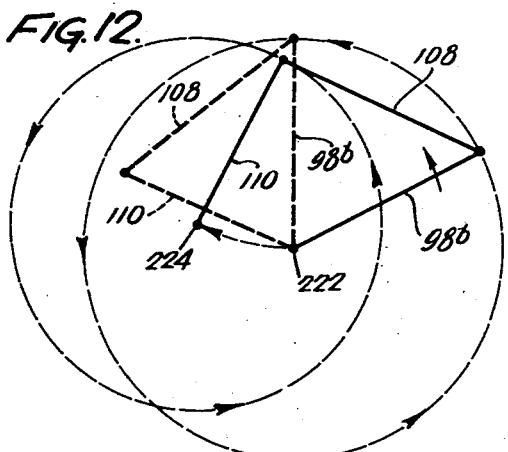
Figure 13:
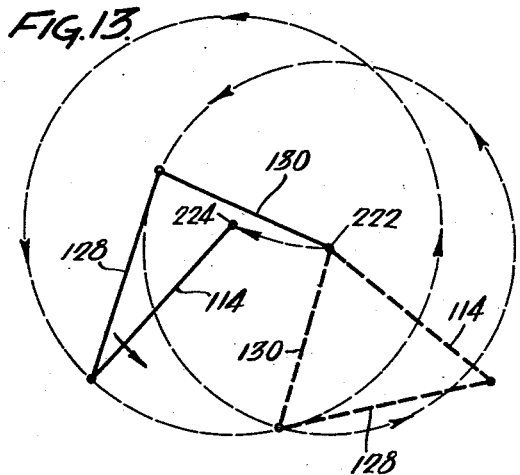

FIGS. 10–13 inclusive will permit the operation and advantages of the present apparatus to be more clearly visualized. These figures show diagrammatically certain positions which the operating parts may assume during certain adjustments. The on center or dead center position is indicated in these figures at 222 while an adjusted position is indicated at 224, wherein the centers or axes of the different units have been angularly displaced, as indicated by broken line 140. The adjusted positions shown are in full lines whereas the on center positions are indicated in broken lines. The circles of movement of the various members are also shown in these drawings with the arrows indicating the direction of rotation. In FIG. 10 arm 82 is driven and link 80 is in compression. In FIG. 11 link 96 is in tension. In FIG. 12, arm 98b is the driver, the link 108 is in compression. In FIG. 13 arm 114 is the driver and link 128 is in tension.

The arrangement and operation of the various elements comprising the quadruple drag link system and the particular support and adjustment means therefor, permit in a very efficient manner the cyclic variation in peripheral speeds of the cutting knives required in high speed operations, with an effective range of sheet sizes not possible with prior art devices. These benefits and advantages are realized while maintaining structural dimensions of the system within reasonable limits. This results in low mass and stresses which could not be realized if prior art devices, such as referred to hereinbefore, were expanded to accommodate the speed and sheet size requirements as defined herein.

From the foregoing description and drawings, the operation and construction of the present invention will be readily apparent to those skilled in the art to which the invention pertains. While only a single embodiment has been shown it is to be understood that minor variations and changes can be effected therein without departing from the spirit and scope of the invention as defined in and limited solely by the appended claims.

We claim:

1. A cyclically variable drive transmission comprising a driving member, four rotatable drag link mechanisms interconnected in series, and having their axes of rotation normally in alignment, the first and last of said mechanisms having stationary axes of rotation, the first of said mechanisms being connected to said driving member, the velocity output of each said mechanism being superimposed on the input of the next succeeding mechanism, means for simultaneously angularly displacing the axes of rotation of the two intermediate ones of said mechanisms equally with respect to the stationary axes of rotation of the others of said mechanisms, to thereby cyclically vary the output velocity of said interconnected mechanisms and a driven member connected to the last of said mechanisms and being imparted the attained cyclically varied velocity thereof.

2. A cyclically variable drive transmission as claimed in claim 1, a pivotally mounted spider cage rotatably supporting said angularly displaceable intermediate mechanisms, means rotatably supporting the others of said mechanisms in stationary position, means adjustably connected to said spider cage for angularly varying the position thereof, variable speed drive means for said driving member, and adjustment means interconnecting said spider cage adjustment means and said variable speed drive means, operable to simultaneously vary speed of rotation of said driven member and cyclical variation in velocity thereof.

3. In a mechanism for cutting continuously advancing strip material into successive sections of predetermined length, a cutting mechanism including coacting rotary cutting cylinders, drive transmission means connected to said cutting cylinders operable to drive said cylinders at a predetermined rate of rotation and to vary the angular velocity thereof in each cycle of rotation, said drive transmission means comprising four rotatable drag link mechanisms interconnected in series and having their axes of rotation normally in alignment, the first and last of said mechanisms having stationary axes of rotation, the first of said mechanisms being connected to a driving member, the velocity output of each said mechanism being superimposed on the input of the next succeeding mechanism, and means for simultaneously angularly displacing the axes of rotation of the two intermediate ones of said mechanism equally with respect to the stationary axes of rotation of the others of said mechanisms for cyclically varying the output velocity of the said mechanisms, the attained velocity of the last said mechanism being imparted to said cutting cylinders.

4. In a mechanism as claimed in claim 3, a pivotally mounted spider cage rotatably mounting said angularly displaceable intermediate mechanisms, means rotatably supporting the others of said mechanisms in stationary position, means adjustably connected to said spider cage for angularly varying the position thereof, variable speed drive means for said drive transmission means, and adjustment means interconnecting said spider cage adjustment means and said variable speed drive means, operable to simultaneously vary speed of rotation of said cutting cylinders and cyclical variation in velocity for synchronism of operation with linear speed of movement of said material for a given predetermined length to be cut.

5. In a mechanism as claimed in claim 4, a sliding brace operatively associated with said spider cage, and selectively operable brake means for locking said spider cage in an adjusted position.

6. A cyclically variable drive transmission adapted for driving a mechanism for cutting continuously advancing strip material into successive section of predetermined length including a cutting mechanism including coacting rotary cutting cylinders, with the drive transmission operably connected to said cutting cylinders; said drive transmission comprising a driving member, a first lever arm connected to said driving member, a first two arm integrated lever having its arms laterally and angularly offset, a link connecting one of said integrated arms to said first lever arm, a double arm lever having one arm thereof connected to the other of said integrated arms by a link, a second two arm integrated lever having its arms laterally and angularly offset, the axes of rotation of said first and second integrated levers being coaxial and concentric and said integrated levers being rotatable with respect to one another, one arm of said second integrated lever being connected to the other of said integrated arms, the other arm thereof being connected to a last lever arm by a link, said last lever arm being adapted for connection to a trunnion of one cutting cylinder for rotation thereof.

7. In a mechanism as claimed in claim 6, the axes of rotation of said first lever arm, said double arm lever, said last lever arm and said one said cutting cylinder being coaxial and fixed, the axes of rotation of said first and second integrated levers being fixed with respect to one another and simultaneously angularly displaceable equally from the axes of rotation of the other said levers whereby output velocity through said last lever arm is cyclically variable.

8. In a mechanism as claimed in claim 7, a pivotally mounted cage rotatably mounting said first and second integrated levers, adjustable means connected to said cage operable to angularly displace said cage and the axes of rotation of said integrated levers.

9. In a mechanism as claimed in claim 8, variable speed drive means for said driving member, and adjustment means interconnecting said adjustable means for said cage and said variable speed drive means, operable to simultaneously vary speed of rotation of said cutting cylinders and cyclical variation in velocity for synchronism of operation with linear speed of movement of said material for a given predetermined length to be cut.

10. A cyclically variable drive transmission comprising a driving member, an annular gear associated with said driving member for rotation thereby and forming a first lever arm, a first link pivotally connected at one end to said gear and spaced from the axis thereof, a second lever arm pivotally connected at one end to the free end of said first link, a hub at the opposite end of said second lever arm, a shaft extending transversely from said hub, a first sleeve like hub connected to the end of said shaft, a third lever arm formed integrally with said sleeve like hub in opposed direction to said second lever arm, a second link pivotally connected to said third lever arm, a first rotatably mounted double arm lever having one arm thereof pivotally connected to said second link, the other arm thereof extending in opposed direction and being pivotally connected to a third link, a second double arm lever having a sleeve like intermediate hub rotatably surrounding said shaft and said first sleeve like hub and the arms thereof extending in opposed directions with one said arm thereof being pivotally connected to said third link and the other arm thereof being pivotally connected to a fourth link, a last lever arm pivotally connected to said fourth link and a driven member connected to the other end of said last lever arm, the axes of rotation of said first lever arm, said first double arm lever, said last lever arm and said one said cutting cylinder being coaxial and fixed, the axes of rotation of the others of said lever arms being simultaneously and equally angularly displaceable whereby output velocity through said last lever arm is cyclically variable.

References Cited in the file of this patent

UNITED STATES PATENTS

| | | |
|---|---|---|
| 2,215,762 | Morrison | Sept. 24, 1940 |
| 2,262,913 | Behrens | Nov. 18, 1941 |
| 2,262,971 | Sieg | Nov. 18, 1941 |
| 2,746,312 | Wood | May 22, 1956 |
| 2,764,033 | Lane | Sept. 25, 1956 |